June 26, 1951   A. MILLER   2,558,190
ELECTROMANOMETER
Filed Aug. 25, 1949
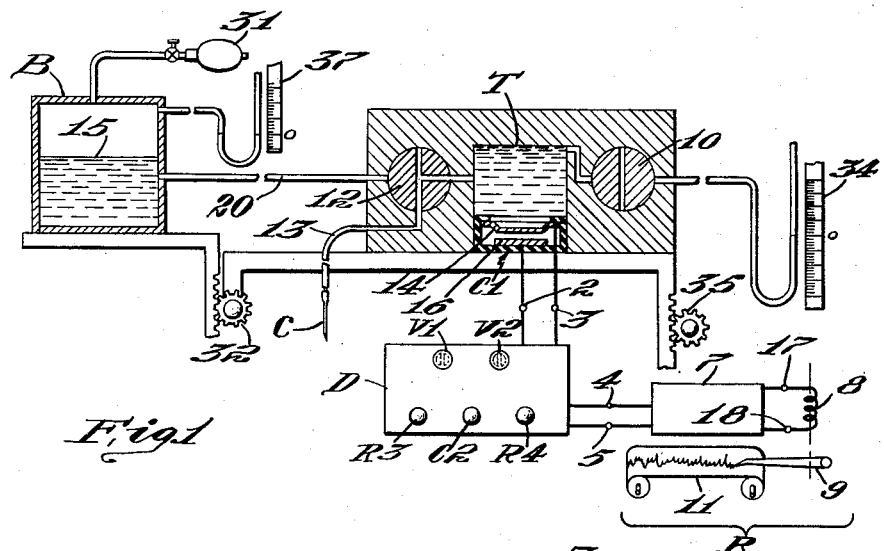
Fig.1
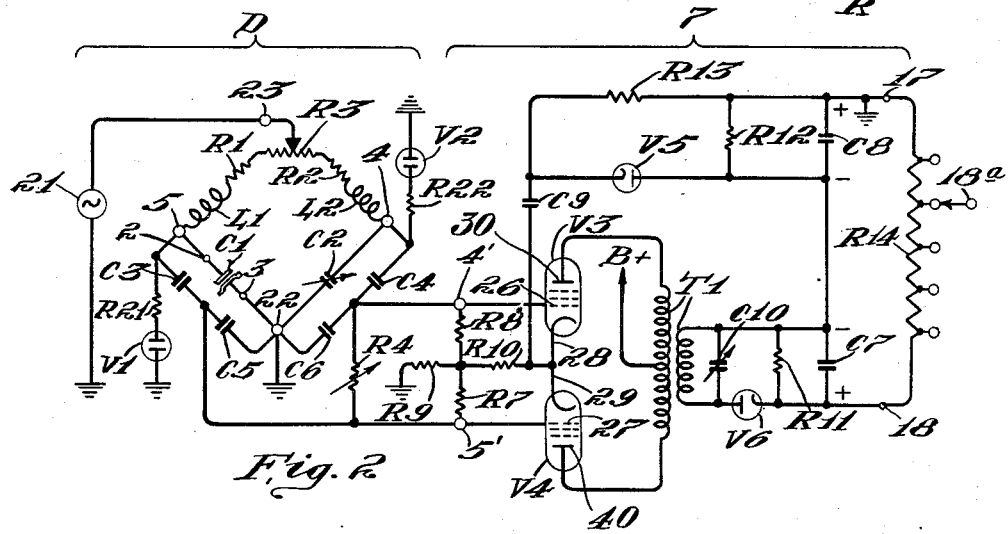
Fig. 2
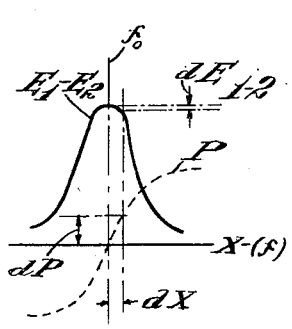
Fig. 3
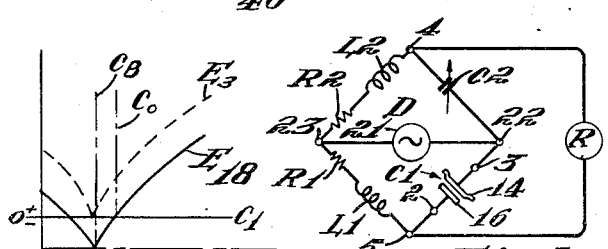
Fig. 4
Fig. 5
Inventor
Arthur Miller
by Roberts, Cushman & Grover
Att'ys.

Patented June 26, 1951

2,558,190

UNITED STATES PATENT OFFICE 2,558,190

ELECTROMANOMETER

Arthur Miller, Watertown, Mass., assignor to Sanborn Company, Cambridge, Mass., a corporation of Massachusetts Application August 25, 1949, Serial No. 112,321

5 Claims. (Cl. 73—398)

This invention relates to electronic apparatus for detecting and amplifying differential signals and particularly to pressure sensing apparatus such as that used by the medical profession for measuring and recording physiological pressure variations. Although the invention has applications in the general field of fluid pressure measurement, for example, in aerodynamic studies it is specially adapted to overcome the difficulties of recording fluid pressures in the human body. In making recordings of body pressures such as intracardiac, intra-arterial, intravenous, and cerebrospinal pulsations a hollow needle, a catheter or a cannula is inserted in the body at the desired location and interconnected by a liquid column with a transducer for detecting the pressures. The transducer usually converts the pressure variations into electrical signals which may be amplified and applied to electrical measuring apparatus such as a recording galvanometer. However, owing to the diversity in frequency and magnitude of physiological pressures previous recording systems have not proven satisfactory. Transducers capable of detecting the high pressures and high frequency components of arterial pulsations react poorly to the low pressure pulsations of the veins. This deficiency is particularly objectionable when a cardiac catheter is to be introduced through the veins into the right or left cariac chambers or the pulmonary arterial bed. As the catheter proceeds through the veins to the heart or the pulmonary arterioles it is desirable to measure the various pressure phenomena as they change with movement of the catheter. With pressure sensing devices such as an optical capsule or a strain gauge transducer employing a diaphragm which distorts under the pressures examined, it is necessary to use a stiff diaphragm for pressure variations containing high frequency components. However, a stiff diaphragm, for instance a metal disc with a radius of approximately 0.5 inch which deflects 0.000015 inch under high arterial pressures of about 200 mm. of mercury, is so slightly deflected under a venous pressure of a few millimeters of mercury that ordinary amplifying circuits associated with the diaphragm cannot produce a usable electrical signal therefrom. Conversely a relatively flexible diaphragm which deflects considerably under low pressures, allows movement of such a large volume of fluid when it deflects that rapid pressure variations cannot be accurately transmitted to the diaphragm through a small bore needle. In industriall measurements of gas and liquid a transducer whose accurate response is limited to a narrow range of pressure magnitudes and frequencies is similarly undesirable.

Objects of the present invention are to provide apparatus uniformly sensitive to various frequencies of pressure variations, which responds to large and small variations in high and low pressure ranges, which will amplify electrical signals produced by the pressure variation without distortion or error, which is simple and economical to manufacture and efficient in operation.

In one aspect the invention involves electronic apparatus used for amplifying the electrical signal produced by a change in a physical property, such as pressure variation, and comprises an electric oscillator, a pair of mutually parallel circuits each coupled to and tuned to resonance with the oscillator and connected as a bridge network, and means for varying the resonant frequency of one of the circuits so that a phase difference is produced between the voltages in each circuit.

Each circuit, which includes an inductive and a capacitative reactance, is substantially resonant at a given frequency when its inductive reactance and capacitative reactance are, at that frequency, approximately equal. Exact resonance at a frequency would, of course, require exact equivalence of capacitative and inductive reactance. A circuit slightly detuned from exact resonance, for example, by a change of one or two per cent in the value of one of the reactances, is here considered to be substantially resonant at the selected frequency. One of the reactances is sensitive to changes in a physical property such as a pressure variation to which it responds by altering its reactive effect in the resonant circuit. Two bridge output terminals each located intermediate the reactances of a circuit are provided. A voltage appears at each of these terminals, the difference between the voltages being proportional to the phase difference between voltages in the circuits. Although the variable reactance may be an inductive component of the resonant circuit, preferably it is a capacitative reactance. A condenser microphone, for example, particularly one having a stiff diaphragm, has been found to be sensitive to a wide range of pressure yet accurately responsive to high and low frequencies and to small pressure variations. A condenser microphone is sensitive to other physical property changes such as variations of thickness or moisture content of matter in its dielectric field. Various well known inductive devices may be used to detect electric and magnetic changes and variations in the mass of a metal.

In a further aspect one of the resonant circuits is slightly detuned from the frequency of the applied potential thereby unbalancing the bridge so that there is a normal phase difference between the currents in each of the circuits and a corresponding normal voltage difference between the output terminals of the bridge, so that as the aforesaid variable reactance responds to increases and decreases in pressure the voltage between the bridge output terminals may correspondingly increase and decrease.

In another aspect the voltages appearing at the bridge output terminals are applied to the control grids of a differential amplifier. The differential amplifier includes a pair of electronic tubes and interconnecting the anodes of each tube an impedance across which appears a voltage difference proportional to the difference between the voltages at the bridge output terminals. A rectifier may be provided for converting the oscillatory voltage developed across the impedance into direct current voltage which is applied to succeeding amplifier input terminals. Since the normal unbalanced condition of the bridge will result in a normal direct current output from the rectifier, a source of compensating direct current equal in magnitude and opposite in polarity to that of the rectifier output is provided, and the compensating voltage added to the rectified normal voltage corresponding to the differential amplifier output. Preferably the differential amplifier is provided with a cathode resistor common to the two amplifying tubes and of such a value that the product of said resistance and the transconductance of a tube is greater than unity, so that an alternating voltage which is proportional to the voltage applied to the grids of the tubes appears at a junction common to both cathodes of the tubes. A second rectifier is provided to rectify this voltage to provide the compensating voltage at the output terminals, so that as the variable reactance responds to positive and negative pressures (that is pressures greater or less than atmospheric or other reference pressure) the voltage at the final output terminals will vary positively and negatively.

In a more specific aspect a meter, preferably a recording galvanometer, is provided for recording the instantaneous values of the voltages appearing at the bridge output or final output terminals. Preferably the meter is an oscillographic apparatus of the direct writing or photographic variety, although a direct reading galvanometer may be used in appropriate applications. In certain cases an extremely sensitive meter such as a string galvanometer may be driven by the signal at the output terminals of the bridge itself. Generally, however, a less sensitive recorder is employed, requiring that the bridge output be amplified and applied through the final output terminals to the recorder.

In a further aspect the invention involves the method of detecting variations in a physical property such as, for example, pressure, thickness, or moisture, by means of an alternating current bridge having a pair of circuits containing inductive and capacitative reactance, the circuits being connected in parallel with a source of alternating current, said method comprising the steps of selecting values for the reactances such that both circuits are tuned to resonance substantially at the frequency of the alternating current source, causing one of the reactances to vary in value according to changes in the physical property so as to vary the resonant frequency of the circuit containing said reactance, and detecting a resultant voltage variation which appears between output terminals of the bridge, the voltage variation being a measure of the property change. An additional step, slightly detuning one of the reactances may be employed to allow the voltage at the terminals to increase and decrease as the physical property increases and decreases in value.

For the purpose of illustration a typical embodiment of the invention is illustrated in the accompanying drawings in which:

Fig. 1 is a diagrammatic view of physiological pressure recording apparatus;

Fig. 2 is a schematic diagram of an electronic pressure sensing circuit;

Figs. 3 and 4 are graphic representations of voltages appearing in the circuit shown in Fig. 2; and Fig. 5 is a simplified schematic diagram of an electronic pressure sensing circuit.

The pressure recording apparatus shown in Fig. 1 includes a catheter C which is inserted in a vessel of the human body, a transducer housing T in which is contained a condenser microphone C1, a bridge network D having input terminals 22 and 23, microphone terminals 2 and 3 and output terminals 4 and 5, an amplifying circuit 7 and a recording device R comprising a galvanometer coil 8, a stylus 9 and a moving strip of recording paper 11. A bottle B containing a saline solution 15 and an anticoagulant, if desired, is interconnected with the transducer chamber T by means of valve 12 and tube 20. Physiological pressures are transmitted from the body through the saline solution in the catheter C, the tube 13, and the valve 12 to the chamber T. Pressure variations in the chamber T cause the diaphragm plate 14 of the condenser microphone C1 to move relative to the other plate 16 of the microphone thus varying its capacitance. This capacitative change causes the bridge D to produce a voltage signal at the detector terminals 4 and 5 which, after rectification and amplification, is applied to the recording galvanometer R.

The basic bridge network D is shown in Fig. 5. A source 21 of oscillating current is coupled to the terminals 22 and 23 of the bridge proper 24. The bridge network includes the two circuits L1—C1—R1 and L2—C2—R2. The values of the reactances of these LCR circuits are chosen so that they have a resonant frequency substantially that of the oscillator 21. For example, if the oscillator has a frequency of 250 kilocycles, the inductances L1 and L2 may have the value of 8 millihenries and the capacitances C1 and C2 may have the value of 50 microfarads. The capacitor C1 comprises the condenser microphone located in the transducer chamber T, one of whose plates 14 is a diaphragm which responds to pressure variations within the transducer chamber. As the pressure in the transducer chamber T increases it forces the diaphragm plate 14 closer to the plate 16 thereby increasing the capacitance of the condenser microphone C1.

Preferably the diaphragm 14 of the condenser microphone has a radius of about 0.5 inch and is sufficiently stiff so that the maximum deflection at its center under a pressure of 500 mm. of mercury is about 0.00004 inch. The tube 13 should be formed of a flexible but relatively non-distensible material such as lead, so that changes in pressure will not materially vary the volume of liquid in the apparatus. The advantages of such a constant volume system may be utilized owing to the high sensitivity of the associated amplifying circuit as will now be explained.

In this novel bridge network, advantage is taken of the fact that, at or near resonance, the voltages developed across the arms $C_1$ and $C_2$ may be many times the voltage impressed on the bridge by the oscillator. Specifically $$E_{C1}=E_0Q_1$$

and $$E_{C2}=E_0Q_2$$

where $E_{C1}$ and $E_{C2}$ are, respectively, the voltages across the capacitances $C_1$ and $C_2$; and $Q_1$ and $Q_2$ are, respectively, the ratios of reactance to resistance in each LCR circuit. By adjustment of the resistances and capacitances in these circuits, the voltages $E_{C1}$ and $E_{C2}$ may be made equal in both magnitude and phase. Under these conditions, the bridge is said to be balanced. Now a slight change in the reactance of one of the circuits will not appreciably change the magnitude of either $E_{C1}$ or $E_{C2}$, but it will produce a phase shift between the two. The resulting voltage difference between point 3 and 4 can be shown to be $$E_3=E_0Q^2\frac{dX}{X}$$

where $E_3$ is the effective voltage across the terminals 4 and 5, $E_0$ is the voltage impressed on the bridge by the oscillator 21, Q is the conventional resonant circuit characteristic relating the ratio of the inductive reactance of one side of the bridge to its resistance, and $dX/X$ is the fractional amount by which the reactance is changed. If the oscillator voltage were 10 volts and the LCR values were selected for a Q of 5, a capacitance change $dX/X$ of only 1% would produce an effective oscillatory voltage between terminals 4 and 5 of 2.5 volts. In comparison, the general expression for proportionality of an ordinary bridge output voltage E to its input voltage $E_0$ is stated by Roberts, "Mechanical Measurements by Electrical Instruments," to be:

$$E=\frac{1}{4}\cdot E_0\cdot dX/X$$

For the same input voltage of the example above E would be only 0.025 volt. Thus, it can be seen that the resonant bridge circuit has a very great sensitivity compared with ordinary bridge networks since for a small change in the capacitance of condenser $C_1$ a relatively large signal will appear across the bridge.

With reference to Fig. 3 it may be noted that the stability of the bridge is not disturbed by small changes in frequency. Curve $E_1$—$E_2$ represents the effective voltage across arms $C_1$ or $C_2$ compared with reactance X of $C_1$ or $C_2$ or with frequency (f) which is a function of reactance X. For values of X such that the resonant frequency of the LCR circuits is nearly the same as the oscillator frequency (inductive reactance approximately equal to capacitative reactance) the arm voltage curve is relatively flat. If the oscillator were to drift slightly from the resonant frequency of the LCR circuits then because the circuits are operating in the flat portion of the voltage curve the change in magnitude $dE_{1-2}$ of the voltages $E_1$ and $E_2$ would not be substantial. Although the phases of both $E_1$ and $E_2$ would be shifted the phase relation between them would remain unchanged, so that the effective bridge output voltage $E_3$ would be unaffected. In contrast the phase angle P between the voltages $E_1$ and $E_2$ (Fig. 3) will undergo a relatively large change $dP$ if a change $dX$ is made in one of the reactances X. Thus the sensitivity of the bridge network, which is due to the use of resonant circuits is obtained without requiring high stability of the oscillator 21.

The effective output voltage $E_3$ is an alternating current of the same frequency as the oscillator. According to the embodiment of Fig. 5, this voltage is sufficient to operate sensitive indicating systems capable of measuring alternating current values; and after amplification and rectification, controlling recording devices. An optical lever for writing on a moving strip of photosensitive paper and other devices well known in the art are suitable.

With a modification the basic circuit described above is capable of sensing and recording either positive or negative pressure changes. Since the bridge output voltages is oscillatory the output has no positive or negative value, but rather an effective value as shown by curve $E_3$ of Fig. 4. With a balanced bridge a given increase or a decrease in pressure (and hence in reactance X) will produce output voltages $E_3$ of the same absolute magnitude. Therefore it is necessary to provide a way of differentiating between positive and negative pressures.

To accomplish this differentiation the bridge network is modified by selecting a value for capacitor $C_2$ less than that of $C_1$ such that the L2—C2—R2 circuit is slightly detuned from the frequency of oscillator 21 and the voltage in circuit L2—C2—R2 normally, that is, in the absence of a pressure signal, is out of phase with circuit L1—C1—R1. The same result may be obtained by increasing the static value $C_0$ (Fig. 4) of condenser $C_1$ above the value $C_B$ at which the bridge is balanced and the bridge output voltage $E_3$ is nil. By either of these means a normal unbalance voltage will appear between the bridge output terminals. The amount of unbalance is small so that circuit L2—C2—R2 still operates in the flat portion of the resonance curve $E_2$, as shown in Fig. 3, and the voltage difference between terminals 4 and 5 is attributable substantially to the phase shift. Owing to the unbalance the recording device R will show an initial indication which may be compensated mentally, mechanically or electrically so that it represents a pressure of zero. If the pressure on condenser C1 increases, this indication will increase in the usual way as the bridge deviates further from balance. If, on the other hand, the pressure decreases below atmospheric pressure so that condenser C1 approaches capacitor C2 in value, the bridge will return toward balance, the output voltage $E_3$ will decrease and the recorder R will show a negative reading with reference to the initial indication. Normally the negative pressures detected in the human body are slight (0 to 30 mm. mercury) compared to the positive pressures (0 to 100 mm. mercury) so that the bridge need only be slightly unbalanced.

A preferred embodiment of the bridge network and differentiating circuits is shown in Fig. 2. As in the basic embodiment the change in capacitative reactance of condenser microphone C1 results in a change in the phase of current in the circuit R1—L1—C1 to which the voltage between the terminals 4 and 5 is proportional. Connected between each of the terminals 4 and 5 and ground are the glow discharge lamps V1 and V2 and dropping resistors, R21 and R22. The values of the resistors are selected so that only when the voltage $E_1$ or $E_2$ across the circuits L1—C1—R1 and L2—C2—R2 are operating near the peak of curve $E_1$—$E_2$ (Fig. 3) is sufficient voltage present across V1 and V2 to cause them to discharge. The bridge is tuned and balanced, first, by adjusting the frequency of the oscillator until lamp V1 glows, and second, by varying capacitor C2 until lamp V2 glows.

Because the voltage used to excite V1 and V2 is greater than that needed for amplifier 7, the instantaneous voltage between each of the terminals 4 and 5 and ground is stepped down by means of the capacitive voltage dividers C3 and C5, and C4 and C6. C3 and C4 have the value of approximately 10 micro-microfarads and C5 and C6 have a value of approximately 100 micro-microfarads. The voltage appearing at the terminals 4' and 5' therefore is approximately 10% of those voltages appearing at terminals 4 and 5 respectively. These voltages are applied to the control grids 26 and 27 of the amplifiers V3 and V4, type 6AU6 or the equivalent, which are connected as a differential amplifier. Across the terminals 4' and 5' are two resistors R7 and R8, each 0.5 megohm. Interconnecting the junction of resistors R7 and R8 and a common junction for the cathodes 28 and 29 is a resistor R10 having a value of 150 ohms. Between the junction of R7 and R8 and ground is a resistor R9 of value of approximately 5000 ohms selected so that a potential approximately equal to the mean of the voltages at terminals 4' and 6' will appear at the cathodes 28 and 29. The voltage difference between the terminals 4 and 6 due to the phase difference between the two resonant circuits will appear as a differential signal between the grids 26 and 27 of the amplifier responds to this signals in the usual way.

The amplitude of the differential signal may be reduced by adjusting the variable resistor R4, which constitutes a sensitivity control for the bridge. An additional tapped control R14 may be connected to terminals 17 and 18 to change the output at terminals 17 and 18a in predetermined steps, thus acting as a pressure range control. The differential signal amplified by tubes V3 and V4 is applied to the primary of transformer T1. Plate voltage B+ is applied to the anodes 30 and 40 of V3 and V4 respectively, through a center tap of the primary of transformer T1. The amplified signals appearing at anodes 30 and 40 are opposed so that when the bridge is in balance the effective voltage across the primary of transformer T1 is nil. However, if the amplified signals are not equal there will be voltage across transformer T1 proportional to the amount of unbalance of the bridge. As previously stated this unbalance voltage is oscillatory and of the same frequency as the oscillator 21. The secondary of transformer T1 and the capacitor C10 comprise a circuit tuned to the frequency of the oscillator in order to obtain maximum amplification. The unbalance voltage developed across the secondary of transformer T1 and the capacitor C10 is rectified by the diode V6 and filtered by resistor R11 and capacitor C7.

As observed above the voltage at the cathodes of the amplifier tubes is nearly equal to the voltages $E_1$ or $E_2$ at terminals 4' and 5' respectively, and remains substantially constant for the small degrees of unbalance with which we are here concerned. This cathode voltage is coupled by capacitor C9 to the rectifier V5 which produces a constant direct current voltage across the filter condenser C8 which is equal and opposed to the static unbalance voltage across capacitor C7. As in the basic embodiment, after the bridge is tuned to resonance variable capacitor C2 is adjusted so that circuit L2—C2—R2 is slightly detuned to the extent that the static unbalance voltage produced thereby results in a voltage drop across the capacitor C7 equal and opposite in polarity to the voltage across C8. The net voltage between load terminals 17 and 18a will be zero in the absence of any pressure signal applied to capacitor C1. As shown by the voltage curve $E_{18}$ of Fig. 4, this output voltage between terminals 17 and 18a is nil for a static value $C_0$ of capacitor C1. As capacitor C1 is increased in value, owing to an increase in pressure, the voltage $E_{18}$ will rise correspondingly. As the capacitance of condenser C1 decreases and approaches a value $C_B$ for which the bridge is balanced, terminal 18a will go negative with respect to terminal 17. As previously explained the range allowed for negative pressures need not be so great as that for positive pressure.

The amplifier and rectifier circuits not only provide an amplified signal suitable for application to recording galvanometers but also eliminate a direct load on the bridge circuit thereby increasing its sensitivity.

The meter may be calibrated before use by the following steps. With valve 12 interconnecting the bottle B and the chamber T, and with valve 10 open, a pressure of a few millimeters of water is applied by means of the hand pump 31. The pressure indicated by stylus 9 on recording paper 11 is compared with the reading on the water manometer 34. The sensitivity control R4 may be adjusted to correct a discrepancy between the manometer and the recorder. With valve 10 closed a higher pressure in the order of two or three hundred millimeters of mercury is then applied by means of the hand pump 31. In this case the reading of the stylus is compared with the reading of the mercury manometer 37.

The operation of the apparatus is as follows: with valve 12 interconnecting the bottle B and transducer chamber T, and valve 10 open, the saline solution 15 is pumped from the reservoir B into the chamber T filling it so that there is no air left in the chamber. Elevating device 32 is then adjusted so that the surface of the saline solution in bottle B is on a level with plate 14 of the condenser microphone C1. The level of water in the water manometer 33 will then be also on a level with the plate 14 and at the zero mark of the scale 34. With valve 10 closed and valve 12 interconnecting the bottle B and the catheter C pressure is applied again by means of the pump 31 causing the catheter to be flushed so that no air bubbles are present in the lead tube 13. The catheter may then be inserted into the vessel of the body for which the pressure variations are to be recorded and valve 12 is adjusted so that the catheter C is interconnected with the transducer chamber T. The apparatus is then ready to record the body pressure variations.

In cases where pressure variations which one wishes to study in detail are superimposed on a relatively large constant pressure component, it is desirable to suppress the zero and thus allow the variations alone to occupy most of the scale of the final indicating or recording device. For example, assume that a given pressure varies between 165 and 200 millimeters of mercury, and that after the absolute values of these pressure levels have been determined, it is desired to examine the 30 millimeter pulsations in detail. To obtain such detail, the appropriate sensitivity range must be chosen by use of R14 so that the full scale represents only 40 or 50 millimeters of pressures. Since the actual pressure is greatly in excess of 50 millimeters the indicator would be driven off the strip of recording paper 11. It is possible, however, to increase the value of $C_2$ so that the bridge approaches balance only when a considerably positive pressure is applied to the diaphragm of $C_1$. By proper adjustment of $C_2$ it is possible to make a pressure of 160 millimeters correspond to the lower edge of the scale of the indicator, and thus display the variations between 165 and 200 millimeters over most of the scale of recording paper 11.

I claim:

1. Pressure sensing apparatus comprising means for producing an oscillating voltage of predetermined frequency, coupled to said means two parallel circuits resonant substantially at said frequency and connected as a bridge, means for unbalancing the bridge to produce a normal phase difference between voltages in the circuits, means responsive to a pressure change to vary the resonant frequency of a circuit so as to produce a resultant phase difference variable about the norm, bridge output terminals between which exists a resultant voltage difference proportional to the phase difference, said resultant voltage difference having a normal value proportional to the normal phase difference, means for applying the voltage difference to other output terminals, a source of voltage equal and opposed to the normal value of the voltage difference, and means for coupling said source to said other terminals, so that the voltage at the terminals depends substantially only on a pressure change.

2. Pressure sensing apparatus comprising means for producing an oscillating voltage of predetermined frequency, coupled to said means two parallel circuits resonant substantially at said frequency and connected as a bridge, means for unbalancing the bridge to produce a normal phase difference between voltages in the circuits, means responsive to a pressure change to vary the resonant frequency of a circuit so as to produce a resultant phase difference variable about the norm, bridge input terminals between which the oscillating voltage is applied and bridge output terminals between which exists a resultant voltage difference proportional to said resultant phase difference, a pair of electronic tubes, each tube having a control grid, a cathode and anode, said tubes being connected as a differential amplifier having a common cathode junction and a plate load impedance interconnecting the anodes of the tube means, connections between the bridge output terminals and the grids, a common cathode resistance interconnecting said junction and one of said input terminals, said resistance having a value such that the voltage at the junction subnstantially equals the means of the voltages at the bridge output terminals, a rectifier for converting a voltage existing across the impedance into a direct current voltage, means for applying the direct current voltage to final output terminals, said direct current voltage having a normal value proportional to the normal phase difference, a second rectifier for converting the voltage at said junction to direct current potential equal and opposite in polarity to the normal value of the aforesaid direct current voltage, and means for adding said potential to said direct current voltage, whereby the voltage at the final output terminals depends substantially only on a pressure change.

3. Pressure sensing apparatus comprising means for producing an oscillating voltage of predetermined frequency, coupled to said means two resonant circuits connected as a bridge, one of said circuits being resonant substantially at said frequency, the other being resonant at a different frequency so as to produce a normal phase difference between the voltages in the circuits, means responsive to a pressure change to vary the resonant frequency of a circuit so as to produce a resultant phase difference variable about said norm, common to each circuit bridge input terminals for said source and, connected intermediate the reactances of each circuit, bridge output terminals between which exists a resultant voltage difference proportional to the resultant phase difference, said resultant voltage having a normal value proportional to the normal phase difference, a pair of electronic amplifying tubes each having a control grid, an anode and a cathode, a common cathode junction, connections between each output terminal and a grid, between one of the input terminals and the junction a common cathode resistor having a resistance value such that the product of said value and the transconductance value of each of said tubes is greater than unity, a rectifier and means for coupling the output of the amplifying tube to the rectifier, the rectifier having a normal output proportional to the normal value of the voltage difference, a meter and means for applying the output of the rectifier to the meter, a second rectifier connected to the junction having an output equal and opposite in voltage to the normal voltage output of the aforesaid rectifier, and means for applying the output of the second rectifier to the meter whereby the meter indicates positive and negative values in response to positive and negative pressures.

4. Pressure sensing apparatus comprising a source of electrical current oscillating at a predetermined frequency, two parallel circuits, each circuit including in series an inductive and a capacitative reactance, one of said capacitative reactances being adjustable in value such that a circuit is slightly detuned from the frequency of said source so as to produce a normal phase difference between voltages in the circuits, the other capacitative reactance including a condenser microphone responsive to pressure changes to vary its reactive effect in the circuit so as to produce a resultant phase difference variable about said norm, connected intermediate an inductive and capacitative reactance of each circuit bridge output terminals between which exists a voltage difference proportional to the resultant phase difference, a pair of amplifying tubes each having a control grid, an anode and a cathode, connections between each output terminal and a grid, a common cathode junction for the amplifying tubes, between one of the input terminals and the junction a common cathode resistor having a resistance value such that the product of said value and the transconductance value of each of said tubes is greater than unity, interconnecting the anodes a primary transformer coil having a center tap connected to an anode voltage supply, a secondary coil for the transformer, in parallel with said secondary a capacitor having a value such that the coil and capacitor are resonant at the predetermined frequency, a diode rectifier and a resistor in series across the capacitor so that a direct current voltage appears across the load resistor proportional to the resultant phase difference, a second diode rectifier, means for coupling the rectifier to the common cathode junction, a resistor in series with the second rectifier of such a value that the direct current voltage drop thereacross is equal and opposite to the normal voltage across the first said load resistor, means interconnecting the two resistors so that the normal voltage drop across them is nil, and a recording galvanometer and means for applying thereto the voltage drop across the two resistors, whereby the voltage applied to the galvanometer may be caused to vary between positive and negative values as the condenser microphone responds to positive and negative pressures.

5. For detecting changes of a physical property by means of an alternating current bridge having in parallel connection to a source of energy oscillating at a given frequency two circuits each containing adjustable inductive and capacitative reactances, the method comprising the steps of setting both circuits to resonate at said frequency, slightly detuning one of the circuits, varying one of the reactances dependent upon a change of said property thereby slightly to change the resonant frequency of the circuit containing said reactance, and detecting the variation of voltage between two taps of the respective circuits, so that said voltage increases and decreases as the value of the physical property increases and decreases.

ARTHUR MILLER.

REFERENCES CITED

The following references are of record in the file of this patent:

UNITED STATES PATENTS

| Number | Name | Date |
| --- | --- | --- |
| 2,367,866 | Humphreys et al. | Jan. 23, 1945 |
| 2,371,040 | Fisher et al. | Mar. 6, 1945 |

OTHER REFERENCES

Book, "Mechanical Measurements by Electrical Methods," Roberts, published by The Instruments Publishing Co. Inc., Pittsburgh, Pa., 1946, pages 208, 209. (Copy in Div. 36.)

Bur. of Standard Bulletin, vol. 3, 1907, pages 389–93. Article by F. W. Grover.